July 5, 1960  A. H. KOSTIC  2,943,420
GLASS BENDING MOLD
Filed July 30, 1954

INVENTOR.
Andy H. Kostic
BY Nobbe & Swope
ATTORNEYS

United States Patent Office 2,943,420
Patented July 5, 1960

2,943,420

GLASS BENDING MOLD

Andy H. Kostic, Rossford, Ohio, assignor to Libbey-Owens-Ford Glass Company, Toledo, Ohio, a corporation of Ohio Filed July 30, 1954, Ser. No. 446,897

7 Claims. (Cl. 49—67)

The present invention relates broadly to the art of bending and more particularly to bending sheets or plates of glass or other plastic material to predetermined curvatures.

It is well known that curved glass sheets to be used for automotive or aircraft windows must be free of surface defects and optical distortions which may hamper or interfere with clear and accurate vision therethrough. Such windows are generally formed from flat polished glass sheets which are supported on molds and subjected to sufficiently high temperatures to cause the sheets to sag until they conform to the shape of the mold. To preserve the surface and optical qualities of the glass, the molds are designed so that the glass is supported along its edges only, and the molds are oriented in the heating furnace so that the maximum glass temperature and, if possible, the maximum bending stresses occur in the region having the sharpest curvature.

In previous practice the glass sheets were supported along their marginal edge portions so that minute imperfections which were reproduced in the surface of the glass as it softened during the bending process were confined to the said marginal portions of the glass. However, it has been found that even though the glass sheets are supported along their marginal edge portions that when the glass deforms during the bending operation, the edge portions slide along the support surface and tend to chip. These chips have proven to be very bothersome in that they tend to gravitate to the lower portions of the mold shaping surface and cause the glass to be scratched as it settles into conformity with the said shaping surface. Thus, it is often times difficult to prevent the edge portions of the mold from spalling chips off the edges of the glass sheets, thereby either cracking the sheet or spoiling its quality in the bent condition by pitting the glass at the point on the mold where the chips come to rest.

It is therefore a primary aim of this invention to overcome the above objections by the provision of an improved form of bending mold whereby glass sheets or plates may be bent to an accurate predetermined curvature of a high quality and relatively free of surface defects.

A further object of the invention is to provide an edge supporting and guiding surface which will present a smooth surface to and contact a sheet being bent along a very narrow strip so as not to restrict or chip said sheet as it is moving to its bent position.

A still further object of the invention is to provide a supporting and guiding surface which will not collect dirt or foreign materials.

Other objects and advantages of the invention will become more apparent during the course of the following description when taken in connection with the accompanying drawings.

In the drawings wherein like numerals are employed to designate like parts throughout the same:

Figure 1:
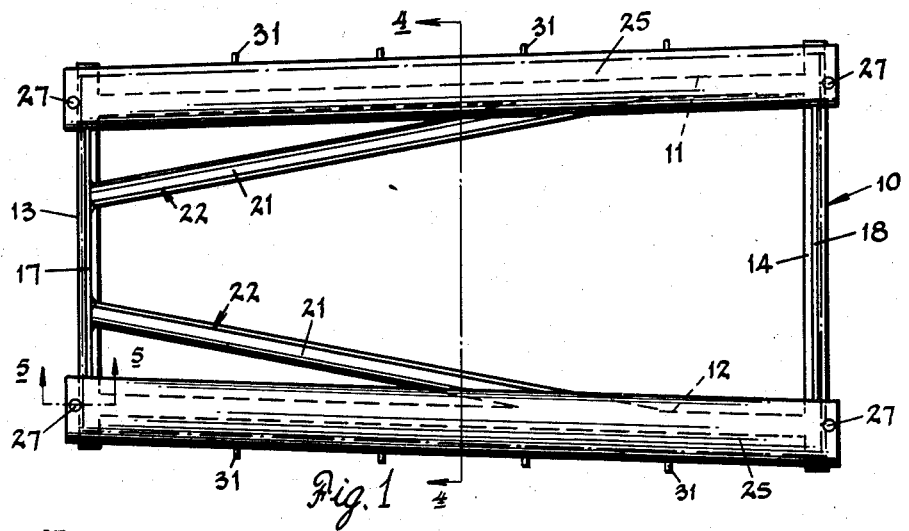
Fig. 1 is a top plan view of a mold constructed in accordance with the invention.
Figure 2:
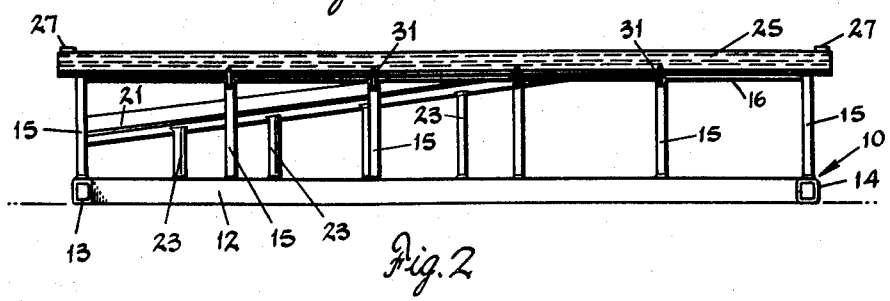
Fig. 2 is a side elevation of the mold.

With reference now to the drawings, there is illustrated a mold of the type contemplated by the invention which includes a substantially rectangular base framework 10 which conforms substantially to the outline of a glass sheet to be bent. This framework is preferably constructed of rectangular cross-sectional tubing arranged to provide longitudinal base members 11 and 12 and transverse base members 13 and 14. Erected on the longitudinal members are a plurality of posts or pedestals 15 which carry upon their upper ends a relatively thin tie strip 16.

Extending along the transverse edges of the mold frame are thin narrow transverse or mold end shaping strips 17 and 18 which are shaped to conform to the size and shape of the outline of the glass sheet in its finally bent or curved form, that is, upon completion of the bending operation which will be described hereinbelow. As may be seen in Fig. 3, such transverse strip members or sections 17 are elevated from the transverse base members 13 and 14 at their ends by the posts 15, and at their center portions by a center post 19, and have suitably spaced holes 20 therein which serve to hasten the transmission of heat through said strip and thereby allow the shaping surface to reach the same temperature as the glass being bent. If desired, the transverse mold strips may be additionally strengthened along their length by additional posts similar to the posts 19.

In order to provide a shaping surface suitable for shaping the central portion of a glass sheet to a conical curvature, there is provided a pair of thin L-shaped rails 21 having a narrow shaping surface 22 thereon. These rails are angularly disposed with respect to each other and to the horizontal and vertical, and are secured to the end transverse strip 17 on their one end and on their other end are secured to the longitudinally extending tie strips 16 substantially midway along the length of the mold. The shaping strips 21 are supported by posts 23 on base tubes 24 welded to the base members 11, 12, 13 and 14, the said tubes 24 being arranged parallel to said strips 21 along a horizontal plane.

Thus, it will be seen that there is herein provided a mold shaping surface conforming to the desired curvature of the glass sheet or plate upon completion of the bending operation. As above described, the transverse end sections 17 and 18, and the oblique L-shaped strips 21 provide a means whereby as the glass is bent it will be supported in its final position upon the said strips which are angularly disposed with respect to each other so as to impart a conical curve to the sheets or plates. However, it will be appreciated that although the present invention is herein described with particular reference to the production of conically curved glass sheets or plates, it is not restricted to this type of curve and that by appropriate alterations the principle of the invention may be applied to the formation of other types of curved bent sheets.

As mentioned hereinabove, it has been found that in prior type molds, marring and chipping of the glass sheet surface will occur many times when the glass moves to its bent position during the bending operation so that a portion of the glass is scratched or marred. Also, it has been found that repeated bending operations on the same mold increase the possibility of optical mars on the glass surface in contact with the mold surface, as minute and often times imperceptible wrinkles and roughened areas will irregularly appear in the guiding surface as a consequence of its expansion and contraction over repeated heating and cooling cycles. These roughened areas in the guiding surface attack the softened "skin" or surface of the glass when heated to bending temperature and cause distortion or irregular stretching in the glass surface, or chips, as it is moving into conformity with the curvature of the shaping surface.

In previous attempts to reduce these effects, it was thought that such conditions could be alleviated by reducing the width of the guiding surface. However, it has been found that such a decrease in the area of the guiding surface actually increases the possibility of surface marring and chipping since there is little support for the glass should it shift laterally as it settles, and also because of the great vulnerability to warpage and wrinkles of the thinner guiding surfaces.

According to the present invention, it has been found that a thin, wide arcuately shaped guiding surface will afford more adequate support for the glass, and furthermore, that the mars or "mold marks" occasioned by slippage and roughened surfaces can be obviated by placing this wider, arcuate surface so as to be tangential to the edge of the glass sheet at all times as it is guided onto the mold shaping surface. As a result of this shape, the arcuate guiding surface will maintain itself relatively free of dirt and foreign material which often times becomes embedded in softened glass.

As herein provided, these arcuate guiding and supporting surfaces take the form of continuous long, narrow, convex plates 25 which are secured to flanged end portions 26 of the longitudinal tie strips 16 by means of rivets or bolts 27 which pass through a hole 28 provided in said plates and said flange. These rivets or bolts 27 have washers or a flanged portion 29 on their ends which are spaced from the flange 26 to allow the said plates 25 to be moved in a vertical direction.

Figure 3:
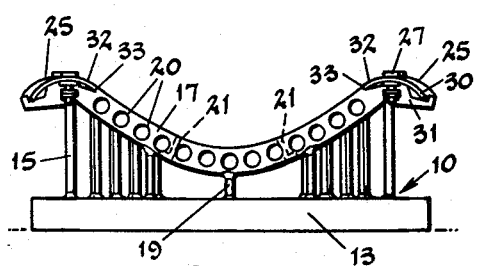
Fig. 3 is an end elevation of the mold.
Figure 4:
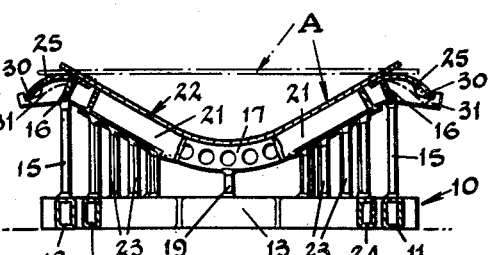
Fig. 4 is a vertical transverse section taken along line 4—4 of Fig. 1.
Figure 5:
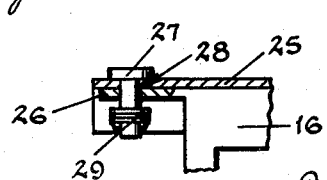
Fig. 5 is a fragmentary sectional view of an edge supporting surface and mounting means therefor taken substantially along line 5—5 of Fig. 1.

As will best be seen in Figs. 3 and 4, the plates are held in place along their outer edges 30 by notched blocks 31 provided on the four corners of the frame; while, the inner edges 32 of the support plates fit in narrow grooves 33 in the transverse mold strips 17 and 18 so as to present an even, smooth surface along the area where the plates 25 meet the said mold strips. In like manner, the oblique L-shaped rails 21 are faired to produce a smooth, continuous surface between the plates 25 and said rails adjacent the area where the said strips are secured to the tie strips 16.

In practicing the invention, a sheet of glass A as illustrated in phantom lines in Fig. 4 is placed in a horizontal position in tangential contact with the convex surface of the supporting plates 25. This sheet may be of a type used in aircraft wherein the edge portions are cut after the sheet has been bent to the proper edge configuration or, it may possibly be a sheet that has been cut to a desired peripheral configuration before it is bent.

As the glass sheet is thus supported prior to passing through a suitable bending furnace, it acts as a horizontal column or strut which is substantially in a condition of equilibrium with the end portions as mentioned above in tangential contact with the said supporting plates 25. The mold and sheets are then heated sufficiently to cause the said sheets to become softened and to drop or settle down by their own weight into conformity with the shaping surfaces 17 and 21 as shown by the full line position of the glass sheet A in Fig. 4. It will be apparent that at all times during the movement of the sheet to its bent position as indicated in Fig. 4, the end areas of the sheet will move in tangential contact with the convex surface of the supporting plates 25 and will not be in sliding contact with sharp or narrow guiding surfaces as was generally the case in prior art molds. Thus, as a result of the smooth and narrow tangential contact line on which the sheets slide, chipping and marring is reduced to a minimum, resulting in curved windows or lights with better optical properties. In its final position, it will be noted that the edge portions of the sheet rest partially on the inner areas of the support plates 25, the surfaces of which blend with the surface of the transverse shaping strips 17 and 18, and the shaping strips 21 to provide a smooth uniform surface.

It is to be understood that the form of the invention disclosed herein is to be taken as the preferred embodiment thereof, and that various changes in the shape, size and arrangement of parts may be resorted to without departing from the spirit of the invention or the scope of the following claims.

I claim:

1. In apparatus for bending glass sheets, a frame, a pair of spaced curved shaping strips mounted above said frame, an arcuate plate of limited width extending between each of the opposite corresponding ends of said curved shaping strips, and a pair of additional shaping strips extending between one of said curved shaping strips and said arcuate plates.

2. In apparatus for bending a glass sheet, a frame, said frame having a first pair of opposed sides along the transverse edges thereof and a second pair of opposed sides along the longitudinal edges thereof, a pair of mold end shaping strips mounted above said frame along said first pair of opposed sides thereof, means mounted above said frame along said second pair of opposed sides of said frame for tangentially supporting a glass sheet during the bending thereof, and a pair of shaping strips engaging one of said end shaping strips and mounted obliquely with respect to said end strips and said means.

3. In apparatus for bending a flat glass sheet, a frame, tie strips mounted above said frame along the longitudinal edges thereof, guiding means carried by said tie strips for supporting said flat glass sheet, transverse shaping strips mounted above said frame along the transverse edges thereof, and oblique shaping strips angularly disposed to each other in both the horizontal and vertical planes below said guiding means, said oblique shaping strips extending between one of said transverse shaping strips and said tie strips.

4. In apparatus for bending a flat glass sheet, a frame, a pair of transverse shaping strips mounted above opposed edges of said frame, a pair of tie strips mounted above said frame and secured to said shaping strips, guiding means carried by said tie strips for supporting said flat glass sheet, and a pair of oblique shaping strips angularly disposed to each other in both the horizontal and vertical planes below said guiding means to impart a conical configuration to said glass sheet when heated to bending temperature, an end of each of said oblique shaping strips being secured to one of said transverse shaping strips and the opposed ends of said oblique shaping strips being secured to said tie strips.

5. In apparatus for bending a flat glass sheet as claimed in claim 4, wherein the opposed ends of said oblique shaping strips are secured to the tie strips substantially midway along the length of said tie strips.

6. In apparatus for bending glass sheets, a frame, a pair of spaced curved shaping strips mounted above said frame, tie strips mounted above said frame and extending between said curved shaping strips, said tie strips having flanged end portions at opposed ends thereof, and a plate movably connected to said flanged end portions, said plate having a convex surface to tangentially support said glass sheets during bending.

7. In apparatus for bending glass sheets, a frame, a pair of spaced curved shaping strips mounted above said frame, tie strips mounted above said frame and extending between said curved shaping strips, arcuate sheet supporting plates extending between said curved shaping strips, and means movably connecting said arcuate sheet supporting plates to said tie strips.

References Cited in the file of this patent

UNITED STATES PATENTS

| | | |
|---|---|---|
| 682,571 | Sage | Sept. 10, 1901 |
| 760,959 | Connington | May 24, 1904 |
| 2,021,180 | Galey | Nov. 19, 1935 |
| 2,223,124 | Owen | Nov. 26, 1940 |
| 2,235,969 | White | Mar. 25, 1941 |
| 2,348,279 | Boyles et al. | May 9, 1944 |
| 2,452,488 | Paddock et al. | Oct. 26, 1948 |
| 2,846,819 | Baker | Aug. 12, 1958 |